US008880719B2

(12) United States Patent
Cooper

(10) Patent No.: US 8,880,719 B2
(45) Date of Patent: Nov. 4, 2014

(54) METHOD AND SYSTEM FOR MULTICAST DELIVERY OF MULTIMEDIA CONTENT ON DEMAND

(71) Applicant: Smiths Detection Inc., Warren, NJ (US)

(72) Inventor: Jonathan Hilton Cooper, Newport, RI (US)

(73) Assignee: Smiths Detection Inc., Warren, NJ (US)

( * ) Notice: Subject to any disclaimer, the term of this patent is extended or adjusted under 35 U.S.C. 154(b) by 0 days.

(21) Appl. No.: 13/657,762

(22) Filed: Oct. 22, 2012

(65) Prior Publication Data

US 2013/0159544 A1    Jun. 20, 2013

Related U.S. Application Data

(63) Continuation of application No. 11/530,661, filed on Sep. 11, 2006, now abandoned.

(60) Provisional application No. 60/715,552, filed on Sep. 9, 2005.

(51) Int. Cl.
```
G06F 15/16      (2006.01)
G06F 15/173     (2006.01)
H04L 12/28      (2006.01)
H04L 12/18      (2006.01)
H04L 29/06      (2006.01)
```
(52) U.S. Cl.
CPC .............. *H04L 65/60* (2013.01); *H04L 12/185* (2013.01); *H04L 65/4076* (2013.01); *H04L 29/06027* (2013.01); *H04L 65/4084* (2013.01)
USPC ............................ 709/231; 709/242; 370/401

(58) Field of Classification Search
USPC ........................... 709/231–244; 370/229–240
See application file for complete search history.

(56) References Cited

U.S. PATENT DOCUMENTS

| | | | |
|---|---|---|---|
| 6,618,752 B1 | 9/2003 | Moore et al. | |
| 7,199,817 B2 | 4/2007 | Mottur et al. | |
| 7,289,500 B1 * | 10/2007 | Amlekar | 370/390 |
| 7,373,394 B1 | 5/2008 | Li et al. | |
| 7,644,182 B2 * | 1/2010 | Banerjee et al. | 709/242 |
| 2002/0075878 A1 * | 6/2002 | Lee et al. | 370/401 |
| 2003/0069930 A1 | 4/2003 | Van Willigen | |
| 2003/0093430 A1 | 5/2003 | Mottur | |
| 2003/0120917 A1 | 6/2003 | Itonaga et al. | |
| 2004/0078624 A1 | 4/2004 | Maxemchuk et al. | |
| 2007/0047545 A1 * | 3/2007 | Bou-Diab et al. | 370/390 |

OTHER PUBLICATIONS

Final Office Action U.S. Appl. No. 11/530,661 dated Aug. 23, 2011.
Non-Final Office Action U.S. Appl. No. 11/530,661 dated Apr. 23, 2012.
Non-Final Office Action U.S. Appl. No. 11/530,661 dated Dec. 28, 2010.

* cited by examiner

*Primary Examiner* — Afshawn Towfighi
(74) *Attorney, Agent, or Firm* — Foley & Lardner LLP

(57) ABSTRACT

A server in connection with a plurality of multimedia sources that has a plurality of clients. The server determines if at least one of the clients is requesting to receive at least one of the sources. The server then multicasts these requested sources to the requesting clients, respectively. If none of the clients is requesting a particular source, the server does not multicast that particular source. If all of the clients cease requesting a particular source that the server is currently multicasting, the server terminates the multicast of that particular source.

19 Claims, 1 Drawing Sheet

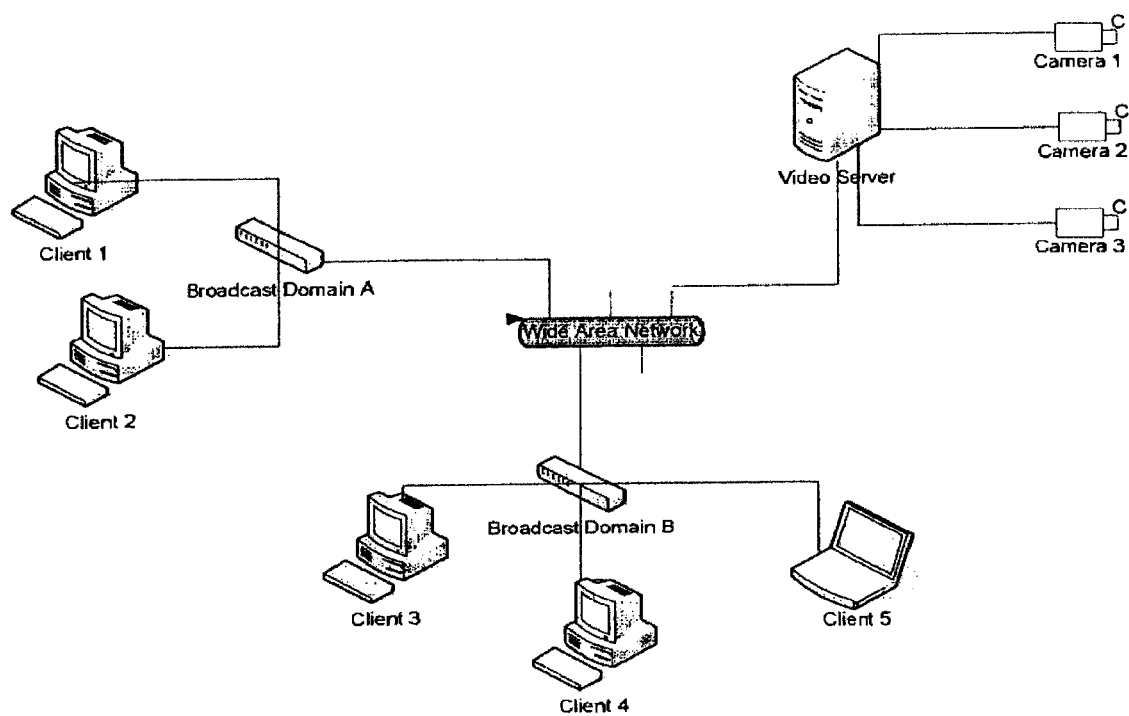

METHOD AND SYSTEM FOR MULTICAST DELIVERY OF MULTIMEDIA CONTENT ON DEMAND

CROSS-REFERENCE TO RELATED PATENT APPLICATIONS

This application is a Continuation application of U.S. Ser. No. 11/530,661 filed Sep. 11, 2006, which claims priority to Provisional U.S. Patent Application Ser. No. 60/715,552, filed Sep. 9, 2005, the contents of each of which are incorporated herein by reference in their entireties.

BACKGROUND OF THE INVENTION

1. Field of the Invention

The present invention relates generally to the transmission of multimedia content on a computer network and more particularly to a multimedia content delivery system and method that maximizes the efficiency of network bandwidth consumption through selective multicasting of the multimedia.

2. Background of the Invention

Multicasting is a communication pattern in which a source host sends a message to a group of destination hosts. Although this can be done by sending unicast (point-to-point) messages to each of the destination hosts, the added consumption of bandwidth and processing power required to establish connections to the destination hosts make unicasting undesirable in this situation. Accordingly, the primary advantage of using multicasting is the decrease in bandwidth consumption. There are many applications which are required to transmit packets to hundreds of destination hosts. The packets sent to these destination hosts share a group of links on their paths to their destinations. Since multicasting requires the transmission of only a single packet by the source host and replicates this packet only as necessary (i.e. at forks of the multicast delivery tree), multicast transmission can conserve scarce network resources.

Another important feature of multicasting, and with which the present application is concerned, is its support for "datacasting" applications. In recent years, multimedia transmission over the internet has become increasingly popular. These transmissions are also referred to as "webcasts", "audiocasts", "videocasts", "podcasts" and other fanciful terms depending on the type of the multimedia content. Most popular is the capture, compression and transmission of audio and video signals from a server to a group of receiving clients. Instead of using a set of point-to-point connections between the participating clients, multicasting can be used to efficiently distribute the multimedia content to all of the clients. Frequently, clients may join or leave an audiocast or a videocast at any time. The flexibility in joining and leaving a group provided by multicasting can make the management of the variable membership much easier to handle. However, current systems that multicast or broadcast multimedia content, broadcast all of the content all of the time regardless of whether clients are requesting the content or not. In this respect, datacasts are comparable to a radio stations or a television stations, which broadcast radio or television signals, respectively, regardless if anybody is listening or watching. On the internet, however, this type of broadcasting-in-the-blind can lead to inefficient use of scarce network resources at best and to severe network congestion at worst. Therefore, there is a need for a multimedia system that can selectively multicast its streaming content based on client usage or requests.

SUMMARY OF THE INVENTION

The present invention solves the problem of the prior art by providing a novel streaming multimedia broadcasting system and method that selectively multicasts its content based on client requests and usage. In particular, the present system includes a server in communication with a plurality of sources and has a plurality of clients. The server determines if at least one of the clients is requesting to receive at least one of the sources. The server then multicasts these requested sources to the requesting clients, respectively. If none of the clients is requesting a particular source, the server does not multicast that particular source. If all of the clients cease requesting a particular source that the server is currently multicasting, the server terminates the multicast of that particular source. By selectively multicasting those sources that are available, significant network resources can be conserved and network congestion can be avoided.

In some embodiments of the present invention, there is a method/device/system for executing a method for delivering, over a network, streaming media content from at least one source to a plurality of clients, the method comprising the actions of multicasting a first streaming content to at least one client of the plurality of clients, and terminating the multicast of the first streaming content upon a determination that none of the plurality of clients desires to continue to receive the first streaming content. In some embodiments, there is a method/system/apparatus as described above/below, where the determination is made at an application layer of a network protocol, although in other embodiments, determinations are not made at an application layer, and in some embodiments, termination of the multicast/prevention of the multicast is includes stopping/preventing the streaming media content from entering/propagating through the network.

Some embodiments discussed above and below further include the action of, before multicasting the first streaming content, determining if at least one client of the plurality of clients desires to receive streaming content from the at least one source. In some embodiments, there is a method/system/apparatus as described above/below, where the action of determining if at least one client of the plurality of clients desires to receive streaming content from the at least one source comprises evaluating received polling messages from one or more clients of the plurality of clients indicative of a desire by one or more clients to continue to receive streaming content from the at least one source.

In some embodiments, there is a method/system/apparatus as described above/below, where the action of determining if at least one client of the plurality of clients desires to receive streaming content from the at least one source comprises evaluating received polling messages from one or more clients of the plurality of clients indicative of a desire by one or more clients to continue to receive streaming content from the at least one source, on the basis of at least one of the number of recently received polling messages; and whether at least one polling message has recently been received. In some embodiments, there is a method/system/apparatus as described above/below, the action of determining if at least one client of the plurality of clients desires to receive streaming content from the at least one source comprises sending polling messages to one or more clients of the plurality of clients requesting confirmation from respective recipients that the respective recipients of the polling questions desire to continue to receive streaming content from the at least one source.

In some embodiments, there is a method/system/apparatus as described above/below, the action of determining if at least one client of the plurality of clients desires to receive streaming content from the at least one source comprises ending polling messages to one or more clients of the plurality of clients requesting confirmation from respective recipients that the respective recipients of the polling questions desire to continue to receive streaming content from the at least one source; and t least one of evaluating responses from respective recipients of the polling questions; and evaluating a lack of responses from respective recipients of the polling questions.

In some embodiments, there is a method/system/apparatus as described above/below, where, before terminating the streaming content, determining if at least one client of the plurality of clients desires to receive streaming content from the at least one source, and terminating the multicast if it is determined at an application layer of a network protocol that no client desires to receive streaming content from the at least one source.

In some embodiments, there is a method/system/apparatus as described above/below, further comprising the action of, after multicasting a first streaming content to at least one client of the plurality of clients, and prior to terminating the multicast of the first streaming content if none of the plurality of clients desires to continue to receive the at least one source, recognizing that at least one other client desires to receive the first streaming content and adding the at least one other client to a multicast address of a multicast transmission constituting the multicasting of the first streaming content.

In some embodiments, there is a method/system/apparatus as described above/below, where the action of determining if at least one client of the plurality of clients desires to receive streaming content from the at least one source comprises at least one of counting a number of open TCP socket connections (physical or otherwise) to a server multicasting the first streaming content to at least one client of the plurality of clients; and determining whether there is an open TCP socket connection to a server multicasting the first streaming content to at least one client of the plurality of clients based on the number of open TCP socket connections counted.

In some embodiments, there is a method/system/apparatus as described above/below, where the action of determining if at least one client of the plurality of clients desires to receive streaming content from the at least one source comprises at least one of: counting a number of open TCP socket connections to a server multicasting the first streaming content to at least one client of the plurality of clients, and determining that no client desires to receive streaming content from the at least one source if the number of open TCP socket connections is below a certain number; and determining whether there is an open TCP socket connection to a server multicasting the first streaming content to at least one client of the plurality of clients, and determining that no client desires to receive streaming content from the at least one source if it is determined that there are no open TCP socket connections. In some embodiments, there is a method/system/apparatus as described above/below, where action of terminating the multicast of the first streaming content upon a determination that none of the plurality of clients desires to continue to receive the at least one source occurs while the streaming content is still being generated and sent to the server. In some embodiments, there is a method/system/apparatus as described above/below, where wherein the first streaming content includes video content generated by a video camera system. In some embodiments, there is a method/system/apparatus as described above/below, further comprising: multicasting the first streaming content to at least one client of the plurality of clients utilizing a server in communication with the at least one source, wherein the at least one source transmits the first streaming content to the server, wherein the multicasting occurs through at least one of: one or more wireless access points, one or more digital subscriber lines, one or more wide area network connections, and one or more local area network connections, wherein the first content includes at least one of text, pictures, video and audio content. In some embodiments, there is a method/system/apparatus as described above/below, where the first streaming content includes video content generated by a first video camera system, the method further comprising the actions of multicasting at least a second streaming content to at least one client of the plurality of clients, the second streaming content including video content generated by a second video camera system; and terminating the multicast of the second streaming content when a determination is made that none of the plurality of clients desires to continue to receive the second streaming content, wherein the actions of multicasting occurring through a same server.

In some embodiments, there is a method/system/apparatus as described above/below, for delivering streaming media content from at least one source to a plurality of clients, comprising the actions of receiving with a server a first streaming content from the at least one source; and at least one of: determining whether at least one client of the plurality of clients desires to receive streaming content from the at least one source before multicasting the first streaming content from the server so that one or more of the plurality of clients may receive the first streaming content; determining whether at least one client of the plurality of clients desires to receive streaming content from the at least one source before multicasting the first streaming content from the server so that one or more of the plurality of clients may receive the first streaming content, wherein if it is determined that the at least one client of the plurality of clients desires to receive streaming content from the at least one source, multicasting the first streaming content so that at least one of the plurality of clients may receive the first streaming content, and wherein if it is determined that no client desires to receive streaming content from the at least one source, preventing the multicasting of the first streaming content; determining whether at least one client of the plurality of clients who has previously received the streaming content from the at least one source multicasted from the server desires to continue to receive streaming content from the at least one source to determine whether to discontinue multicasting the first streaming content from the server; and determining whether at least one client of the plurality of clients who has previously received the streaming content from the at least one source multicasted from the at least one server desires to continue to receive streaming content from the at least one source multicasted from the server to whether to discontinue multicasting the first streaming content from the at least one server, wherein if it is determined that the at least one client of the plurality of clients who has previously received the streaming content from the at least one source desires to not continue to receive streaming content from the at least one source, terminating multicasting of the first streaming content, and wherein if it is determined that the at least one client of the plurality of clients who has previously received the streaming content from the at least one source desires to continue to receive streaming content from the at least one source, continuing multicasting the first streaming content.

BRIEF DESCRIPTION OF THE DRAWINGS

These and other features, aspects, and advantages of the present invention will become better understood with reference to the following description, appended claim, and accompanying drawing where:

FIG. 1 is a schematic view of a computer network of the preferred embodiment of the present invention.

DETAILED DESCRIPTION OF THE PREFERRED EMBODIMENTS

Referring to FIG. 1, an example of a network system is shown where there are five (5) clients and three (3) cameras (or sources) in communication with a server through various network connections. Although the following description will refer to video captured through cameras as a matter of convenience, it is to be understood that the present invention can accommodate all types streaming content, including without limitation such formats as text, pictures, and audio. Moreover, in some embodiments, various types of networks and/or connections to the servers may be utilized. Moreover, the number of clients and sources may also vary. Accordingly, in some embodiments, the clients and sources may connect to the server through any number of ways including, by way of example only and without limitation, wireless access points, digital subscriber lines, wide area network connections and/or local area network connections.

FIG. 1 depicts an example of a system where there are 5 clients and 3 video sources. In a typical multicast IP video system, all 3 cameras would be broadcasting to all parts of the network all of the time. Accordingly, if each camera was transmitting 1 Mbps of data, then Broadcast Domain A and Broadcast Domain B would each be handling 3 Mbps of data and 3 Mbps would be going to each Network Interface Card (NIC) on each client. If there were 300 cameras, the number would be 300 Mbps and this could start to cause network congestion.

In a system implementing some embodiments of the present invention, the video server may not send any video until one of the clients requested it. That way, the server would start multicasting once it received a request from a single client for a particular resource. If it received a subsequent request, it would continue streaming just that resource. When a client no longer needed the stream, the server would take note of that and once no client needed the stream, it would stop streaming.

The server of some embodiments of the present invention, which may include a processor which may include logic to implement some or all of the embodiments described herein, may receive a constant stream of video from the cameras communicating with it. However, the server does not multicast all of these video feeds all of the time, as in the prior art. Instead, it checks to see whether any of the clients are requesting to view any of the video from any of the particular cameras. If none of the clients is requesting the video from a particular camera, the server does not multicast that cameras' content. If however, at least one client desires to view the video from a particular camera, the server multicasts that camera's video stream to the client. If subsequent other clients desire to receive the video feed of that camera, the server merely takes note that there is an additional client and the client is added to the multicast address of the multicast transmission. It can be appreciated that in some implementations, this conserves significant network resources because only a single transmission is being made of any particular camera's video. If, however, all of the clients cease requesting a particular video feed, as may happen from time to time, the server may terminate the multicast of that video, thereby further conserving network resources. Referring back to the imperfect radio and television analogy made earlier, it can be appreciated that the present system ceases to datacast the content that nobody is listening or watching.

"By terminating the multicast," etc., it is meant the prevention of the placement of streaming media content onto a network if no client desires to receive the content and the suspension of propagation of the streaming media content through the network if no client desires to continue receiving the content. That is, in some embodiments of the present invention, content being sent to a server by, for example, a video camera, is not placed onto the network (and thus not multicasted), if no client desires the content. In this regard, in some embodiments, there is a video distribution system, comprising, a server and a plurality of cameras adapted to send respective streaming video contents to the server. The server is adapted to receive at least some of the sent streaming video contents and adapted to multicast at least some of the received streaming media content to a plurality of clients over a network. Further, in this system, the total bit rate of the streaming video contents capable of being received by the server exceeds a network bandwidth, and the server is adapted to limit the number of multicasts of respective streaming media contents to a total bit rate that does not exceed the network bandwidth by determining whether at least one of the received streaming video contents is desired to be viewed by a client and not placing that at least one received streaming video onto the network if the at least one client does not desire to view the received streaming video. In such embodiments, 50, 60, 70, 80, 90, 100, 300 or more cameras may be in communication with the server, and the negative effects of a saturated network may be avoided, even though the input into the server exceeds the bandwidth of the network. For example, in the case of UDP traffic, there will be no latency or slowdown in the video, and in the case of TCP traffic, there will be no data transfer shutdowns, etc., because only certain contents from certain cameras will be put on the network because only those contents are requested/or a sufficient number of contents that are not desired are removed from the network so as to bring the total bit rate to below the maximum bandwidth. Thus, in some embodiments, the present invention provides for a system that permits management of what is propagated through the network based on client desires.

In some embodiments of the invention, not placing the content onto the network alleviates the need to utilize network switches/network switching to gain efficiencies in utilizing the bandwidth.

Although methods of tracking the number of requests for a particular video feed are numerous, an example would be to count the number of open TCP socket connections to the server for a particular camera. When a client requests a particular video feed from the server, a connection is established, typically by opening its own TCP socket to the server. When the client desires to cease viewing a video feed, this same TCP socket is closed. In such a regime, the number of clients viewing a particular camera video feed always corresponds to the number of open TCP sockets at the server. By counting the number of open TCP sockets, the server can readily determine whether to continue to multicast a particular camera video feed or to terminate that multicast. Although counting open TCP sockets is one method of determining the number of clients interested in the particular content of a camera, any communication protocol that establishes a connection to the server, such as HTTP, etc., may be used as an indicator.

Alternatively, the client may send a regular polling message to the server to indicate that it was still interested in receiving the content of the camera. The server could then keep track of the number of recently received polling messages to determine whether to continue the multicast of the video. Alternatively, or in addition to this, the client may send a message indicating it was interested in the video feed of a particular camera, and then periodically the server could send a polling message to the viewing clients to ensure that they are still interested in receiving the content. By keeping track of the responses from the clients, the server may determine to continue to datacast the video feed. In some embodiments of the present invention, a determination is made whether at least one client of the plurality of clients desires to receive streaming content from the at least one source. This determination may include evaluating received polling messages from one or more clients of the plurality of clients indicative of a desire by one or more clients to continue to receive streaming content from the at least one source, on the basis of at least one of the number of recently received polling messages, and whether at least one polling message has recently been received. In this regard, if a polling message has not been received within a predetermined or variable time identified by a system administrator, etc., a determination may be made that no client desires to receive streaming video. In some embodiments, this determination includes sending polling messages to one or more clients requesting confirmation from respective recipients that the respective recipients of the polling questions desire to continue to receive streaming content from the at least one source. This may further include evaluating responses from respective recipients of the polling questions and/or evaluating a lack of responses from respective recipients of the polling questions, wherein if the responses are indicative of a negative desire to receive content, and/or if no responses are received, a determination may be made that no client desires to receive this content.

Therefore, it can be seen that some embodiments of the present invention provide a unique solution to the problems of the prior art by providing a system that may selectively multicast its streaming multimedia content based on client usage and/or requests.

Some embodiments of the present invention may be implemented with programming/logic/software/controls, etc., at the so-called application layer of a network protocol. In some embodiments, the application layer allows a user to access information on the network through an application. This layer may be the main interface for the user(s) to interact with the application and therefore the network. Some examples of application layer protocols include, by way of example only, and not by way of limitation, Telnet, File Transfer Protocol (FTP), Simple Mail Transfer Protocol (SMTP) and Hypertext Transfer Protocol (HTTP). In some embodiments, the network protocol may include some or all of the seven layers of the open system interconnection (OSI) model, the application layer being analogous to the seventh layer of that model. That is, in a network having the OSI model with seven layers, the programming, logic, software and/or controls, implementing some embodiments of the present invention will be at the seventh layer, or its equivalent.

In an exemplary embodiment of the present invention, there is a method for delivering, over a network, streaming media content from at least one source to a plurality of clients. This method may comprise the actions of multicasting a first streaming content to at least one client of the plurality of clients, and terminating the multicast of the first streaming content upon a determination made at an application layer of a network protocol (which may be done, for example, with logic at the application layer) that none of the plurality of clients desires to continue to receive the first streaming content.

The present invention includes methods for practicing the invention, software to practice the invention, logic (including hardware, software and/or firmware) to practice the invention, and apparatuses configured to implement the present invention. Accordingly, the present invention includes a program product and hardware and firmware for implementing algorithms to practice the present invention, as well as the systems and methods described herein, and also for the control of the devices and implementation of the methods described herein.

It is noted that the term "processor," as used herein, encompasses both simple circuits and complex circuits, as well as computer processors.

It is further noted that the teachings of the present invention may be combined with the teachings of one or both of U.S. patent application Ser. No. 09/912,869 entitled Methods and Systems for Networked Camera Control, to Peter Mottur and Ethan Zimmer, filed Jul. 25, 2001, and U.S. patent application Ser. No. 10/301,344 entitled Methods and Systems to Control Access to Network Devices, to Peter Mottur, filed Nov. 21, 2002, the contents of these applications being incorporated by reference herein in their entirety. This is especially the case with respect to the teachings relating to the camera networks and ancillary components discussed therein.

In some embodiments of the present invention, there is a method/system/apparatus as described above/below, comprising the actions of receiving with a server a first streaming content from the at least one source; placing the first streaming content onto the network and multicasting the first streaming content; and while receiving with the server the first streaming content from the at least one source, determining whether all of the plurality of clients have ceased to desire to receive the multicasted first streaming content from the at least one source, and if a determination is made that all of the plurality of clients have ceased to desire to receive the multicasted first streaming content from the at least one source, preventing the first streaming content from continuing to enter the network, and if a determination is made that at least one of the plurality of clients continues to desire to receive the multicasted first streaming content from the at least one source, continue multicasting of the first streaming content and continue placing the first streaming content onto the network. In some embodiments, there is a method/system/apparatus as described above/below, comprising the actions of: determining if at least one client of the plurality of clients desires to receive at least one source of the plurality of sources; multicasting the at least one source to the at least one client; and terminating the multicast of the at least one source if none of the plurality of clients desires to continue to receive content from the at least one source.

In some embodiments, there is a method/system/apparatus as described above/below, where a server is adapted to receive a first streaming media content from a first source and adapted to multicast the received first streaming media content to at least one client of the plurality of clients, wherein the server includes logic, which, in some embodiments, is at an application layer of a network protocol, to determine whether any of the plurality of clients desires to at least one of: receive a multicast transmission of the first streaming media content; and continue receiving a multicast transmission of the first streaming media content, and wherein the server includes logic, in some embodiments at the application layer of the network protocol, to at least one of: not initiate multicasting of the first streaming media content if it is determined that no client desires to receive the multicast transmission of the first streaming media content; and terminate multicasting of the first streaming media content if it is determined that no client desires to continue receiving the multicast transmission of the first streaming media content. In some embodiments, there is a method/system/apparatus as described above/below, wherein the server includes logic to evaluate, in some embodiments at the application layer of the network protocol, received polling messages from one or more clients of the plurality of clients indicative of a desire by one or more clients to at least one of receive and continue to receive streaming content from the at least one source, and determine whether to, based on the evaluation, at least one of: not initiate multicasting of the first streaming media content if it is determined that no client desires to receive the multicast transmission of the first streaming media content; and terminate multicasting of the first streaming media content if it is determined that no client desires to continue receiving the multicast transmission of the first streaming media content. In some embodiments, there is a method/system/apparatus as described above/below, wherein the server is adapted to send polling messages to one or more clients of the plurality of clients requesting confirmation that respective recipients of the polling questions desire to at least one of receive and continue to receive streaming content from the at least one source, wherein the server includes logic at the application layer of the network protocol to at least one of analyze received responses to the polling messages and evaluate a lack of received responses to the polling messages in order to at least one of make a determination as to whether at least one client of the plurality of clients desires to at least one of receive streaming content and continue to receive streaming content from the at least one source. In some embodiments, there is a method/system/apparatus as described above/below, where there is a server adapted to receive a first streaming media content from a first source and adapted to multicast the received first streaming media content to at least one client of the plurality of clients, wherein the server includes logic to determine whether any of the plurality of clients desires to at least one of: receive a multicast transmission of the first streaming media content; and continue receiving a multicast transmission of the first streaming media content, and wherein the server includes logic to at least one of prevent the first streaming media content from being placed on the network and prevent the first streaming media content from continuing to be placed on the network if at least one of it is determined that no client desires to receive the multicast transmission of the first streaming media content; and it is determined that no client desires to continue receiving the multicast transmission of the first streaming media content.

In some embodiments, there is a method/system/apparatus as described above/below, where the server includes logic to evaluate received polling messages from one or more clients of the plurality of clients indicative of a desire by one or more clients to at least one of receive and continue to receive streaming content from the at least one source, and determine whether to, based on the evaluation, at least one of prevent the first streaming media content from being placed on the network and prevent the first streaming media content from continuing to be placed on the network if at least one of: it is determined that no client desires to receive the multicast transmission of the first streaming media content; and if it is determined that no client desires to continue receiving the multicast transmission of the first streaming media content. In some embodiments, there is a method/system/apparatus as described above/below, where the server is adapted to send polling messages to one or more clients of the plurality of clients requesting confirmation that respective recipients of the polling questions desire to at least one of receive and continue to receive streaming content from the at least one source, wherein the server includes logic to at least one of analyze received responses to the polling messages and evaluate a lack of received responses to the polling messages in order to at least one of make a determination as to whether at least one client of the plurality of clients desires to at least one of receive streaming content and continue to receive streaming content from the at least one source.

In some embodiments, there is a program product, comprising: a program product for delivering streaming media content from at least one source to a plurality of clients comprising machine-readable program code for causing, when executed, a machine to perform some or all of the various actions, methods, etc., described above and/or below. In some embodiments, the machine is a server system, and in some embodiments, the program product is adapted for utilization at the application layer of a network protocol.

In some embodiments, there a program product for delivering streaming media content from at least one source to a plurality of clients comprising machine-readable program code for causing, when executed, a machine to perform some or all of the various methods/actions, etc., described above and/or below. In some embodiments, there is a method/system/apparatus as described above/below, for distributing a plurality of streaming video contents over a network without exceeding network bandwidth capacity due to the total bit rate of the plurality of streaming video contents, the method comprising the actions of: executing some or all of the various actions/methods, etc., described above/below, where the first streaming content is a first streaming video content, if the total bit rate of the plurality of streaming video contents approaches the network bandwidth capacity.

In some embodiments, there is a method/system/apparatus as described above/below, including preventing a new client from receiving the first streaming content if the total bit rate of the plurality of streaming video contents would exceed the network bandwidth capacity. In some embodiments, there is a method/system/apparatus as described above/below, including providing a message to the new client annunciating denial of receipt of the first streaming content upon preventing the new client from receiving the first streaming content. In some embodiments, there is a method/system/apparatus as described above/below, for distributing a plurality of streaming video contents over a network without exceeding network bandwidth capacity due to the total bit rate of the plurality of streaming video contents, the method comprising the actions of: executing some or all of the various actions/methods described above and/or below, where the first streaming content is a first streaming video content, if the total bit rate of the plurality of streaming video contents approaches the network bandwidth capacity.

In some embodiments, there is a method/system/apparatus as described above/below, further comprising multicasting at least a second streaming content to at least one client of the plurality of clients, the second streaming content including video content generated by a second video camera system; and continuing the multicast of the second streaming content after a determination is made, in some embodiments at the application layer of the network protocol, that at least one of the plurality of clients desires to continue to receive the second streaming content, wherein, in some embodiments, the actions of multicasting occurring through a same server. In some embodiments, there is a method/system/apparatus as described above/below, there is a video distribution system, comprising a server; and a plurality of cameras adapted to send respective streaming video contents to the server, wherein the server is adapted to receive at least some of the sent streaming video contents and adapted to multicast at least some of the received streaming media content to a plurality of clients over a network, wherein the total bit rate of the streaming video contents capable of being received by the server exceeds a network bandwidth, and wherein the server is adapted to limit the number of multicasts of respective streaming media contents to a total bit rate that does not exceed the network bandwidth by determining whether at least one of the received streaming video contents is desired to be viewed by a client and not placing that at least one received streaming video onto the network if the at least one client does not desire to view the received streaming video.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

What is claimed is:

1. A method for delivering, over a network, streaming media content from at least one source to a plurality of clients, the method comprising the actions of:
   determining, at an application layer of a network protocol, if at least one client of the plurality of clients desires to receive streaming content from the at least one source;
   multicasting a first streaming content to at least one client of the plurality of clients; and
   terminating the multicast of the first streaming content upon a determination that none of the plurality of clients desires to continue to receive the first streaming content,
   wherein the step of determining if at least one client of the plurality of clients desires to receive streaming content from the at least one source comprises evaluating regularly received polling messages from one or more clients of the plurality of clients indicative of a desire by one or more clients to continue to receive streaming content from the at least one source, and
   wherein the step of determining if at least one client of the plurality of clients desires to receive streaming content from the at least one source comprises determining that no client desires to receive the streaming media content if a polling message has not been received within a predetermined time after a previous polling message has been received.

2. The method of claim 1, further comprising the step of, after multicasting the first streaming content to at least one client of the plurality of clients, and prior to terminating the multicast of the first streaming content if none of the plurality of clients desires to continue to receive the at least one source, recognizing at the application layer of the network protocol that at least one other client desires to receive the first streaming content and adding the at least one other client to a multicast address of a multicast transmission constituting the multicasting of the first streaming content.

3. The method of claim 1, wherein the step of terminating the multicast of the first streaming content upon a determination that none of the plurality of clients desires to continue to receive the at least one source occurs while the streaming content is still being generated and sent to the server.

4. The method of claim 1, wherein the first streaming content includes video content generated by a video camera system.

5. The method of claim 1, further comprising:
   multicasting the first streaming content to at least one client of the plurality of clients utilizing a server in communication with the at least one source, wherein the at least one source transmits the first streaming content to the server,
   wherein the multicasting occurs through at least one of one or more wireless access points, one or more digital subscriber lines, one or more wide area network connections, or one or more local area network connections, and
   wherein the first content includes at least one of text, pictures, video or audio content.

6. The method of claim 1, wherein the first streaming content includes video content generated by a first video camera system, the method further comprising the actions of:
   multicasting at least a second streaming content to at least one client of the plurality of clients, the second streaming content including video content generated by a second video camera system; and
   terminating the multicast of the second streaming content when a determination is made at the application layer of the network protocol that none of the plurality of clients desires to continue to receive the second streaming content,
   wherein the actions of multicasting the first and second streaming content occur through a same server.

7. The method of claim 1, further comprising multicasting at least a second streaming content to at least one client of the plurality of clients, the second streaming content including video content generated by a second video camera system: and
   continuing the multicast of the second streaming content after a determination is made at the application layer of the network protocol that at least one of the plurality of clients desires to continue to receive the second streaming content,
   wherein the actions of multicasting occurring through a same server.

8. An apparatus for delivering, streaming media content from at least one source to a plurality of clients over a network, the apparatus comprising:
   a server configured to receive a first streaming media content from a first source and configured to multicast the received first streaming media content to at least one client of the plurality of clients,
   wherein the server includes logic at an application layer of a network protocol to determine whether any of the plurality of clients desires to at least one of:
      receive a multicast transmission of the first streaming media content; or
      continue receiving a multicast transmission of the first streaming media content, and
   wherein the server includes logic at the application layer of the network protocol to at least one of:
      not initiate multicasting of the First streaming media content if it is determined that no client desires to receive the multicast transmission of the first streaming media content; or
      terminate multicasting of the first streaming media content if it is determined that no client desires to continue receiving the multicast transmission of the first streaming media content
   wherein the server includes logic to evaluate, at the application layer of the network protocol, regularly received polling messages from one or more clients of the plurality of clients indicative of a desire by one or more clients to at least one of receive or continue to receive streaming content from the at least one source, and determine, based on the evaluation, whether to at least one of:

not initiate multicasting of the first streaming media content if it is determined that no client desires to receive the multicast transmission of the first streaming media content, or terminate multicasting of the first streaming media content if it is determined that no client desires to continue receiving the multicast transmission of the first streaming media content, and wherein the server is configured to determine that no client desires to receive the streaming media content if a polling message has not been received within a predetermined time after a previous polling message has been received.

9. An apparatus for delivering streaming media content from at least one source to a plurality of clients over a network, the apparatus comprising:

a server configured to receive a first streaming media content from a first source and configured to multicast the received first streaming media content to at least one client of the plurality of clients, wherein the server includes logic, at an application layer of a network protocol, to determine whether any of the plurality of clients desires to at least one of:

receive a multicast transmission of the first streaming media content; or continue receiving a multicast transmission of the first streaming media content, and wherein the server includes logic to at least one of prevent the first streaming media content from being placed on the network or prevent the first streaming media content from continuing to be placed on the network if at least one of:

it is determined that no client desires to receive the multicast transmission of the first streaming media content; or it is determined that no client desires to continue receiving the multicast transmission of the first streaming media content wherein the server includes logic to evaluate, at the application layer of the network protocol, regularly received polling messages from one or more clients of the plurality of clients indicative of a desire by one or more clients to at least one of receive or continue to receive streaming content from the at least one source, and determine, based on the evaluation, whether to at least one of prevent the first streaming media content from being placed on the network or prevent the first streaming media content from continuing to be placed on the network if at least one of:

it is determined that no client desires to receive the multicast transmission of the first streaming media content; or if it is determined that no client desires to continue receiving the multicast transmission of the first streaming media content, and wherein the server is configured to determine that no client desires to receive the streaming media content if a polling message has not been received within a predetermined time after a previous polling message has been received.

10. A non-transitory computer-readable medium containing a program product for delivering streaming media content from at least one source to a plurality of clients comprising machine-readable program code for causing, when executed, a machine to perform the method of claim 1, wherein the machine is a server system and wherein the program product is configured for utilization at the application layer of a network protocol.

11. A method of distributing a plurality of streaming video contents over a network without exceeding network bandwidth capacity due to the total bit rate of the plurality of streaming video contents, the method comprising the actions of:

executing the actions of claim 1, where the first streaming content is a first streaming video content, if the total hit rate of the plurality of streaming video contents approaches the network bandwidth capacity.

12. The method of claim 11, further comprising:

preventing a new client from receiving the first streaming content if the total bit rate of the plurality of streaming video contents would exceed the network bandwidth capacity.

13. The method of claim 12, further comprising:

providing a message to the new client annunciating denial of receipt of the first streaming content upon preventing the new client from receiving the first streaming content.

14. A video distribution system, comprising:

a server; and a plurality of cameras configured to send respective streaming video contents to the server, wherein the server is configured to receive at least some of the sent streaming video contents and configured to multicast at least some of the received streaming video contents to a plurality of clients over a network, and wherein the server is configured to limit the number of multicasts of respective streaming media contents to a total bit rate that does not exceed a network bandwidth by determining, at an application layer of a network protocol, whether at least one of the received streaming video contents is desired to be viewed by a client and not placing that at least one received streaming video onto the network if the at least one client does not desire to view the received streaming video wherein the server includes logic to evaluate, at the application layer of the network protocol, regularly received polling messages from one or more clients of the plurality of clients indicative of a desire by one or more clients to receive at least one of the streaming video contents, and determine, based on the evaluation, whether to prevent the at least one of the streaming video contents from being placed on the network if at least one of:

it is determined that no client desires to receive the multicast transmission of the at least one of the streaming video contents; or if it is determined that no client desires to continue receiving the multicast transmission of the at least one of the streaming video contents, and wherein the server is configured to determine that no client desires to receive the streaming media content if a polling message has not been received within a predetermined time after a previous polling message has been received.

15. A method for delivering, over a network, streaming media content from at least one source to a plurality of clients, the method comprising the actions of:

determining if at least one client of the plurality of clients desires to receive streaming content from the at least one source;

multicasting a first streaming content to at least one client of the plurality of clients; and terminating the multicast of the first streaming content upon a determination made at an application layer of a network protocol that none of the plurality of clients desires to continue to receive the first streaming content,
wherein the step of determining if at least one client of the plurality of clients desires to receive streaming content from the at least one source comprises periodically sending polling messages to one or more clients of the plurality of clients requesting that respective recipients of the polling messages respond with a message indicating that the respective recipients desire to continue to receive streaming content from the at least one source.

16. The method of claim 15, wherein there evaluation is made on the basis of at least one of:
responses from respective recipients of the polling questions; or
a lack of responses from respective recipients of the polling questions.

17. An apparatus for delivering streaming media content from at least one source to a plurality of clients over a network, the apparatus comprising:
a server configured to receive a first streaming media content from a first source and configured to multicast the received first streaming media content to at least one client of the plurality of clients,
wherein the server includes logic at an application layer of a network protocol to determine whether any of the plurality of clients desires to at least one of:
receive a multicast transmission of the first streaming media content; or
continue receiving a multicast transmission of the first streaming media content, and
wherein the server includes logic at the application layer of the network protocol to at least one of:
not initiate multicasting of the first streaming media content if it is determined that no client desires to receive the multicast transmission of the first streaming media content; or
terminate multicasting of the first streaming media content if it is determined that no client desires to continue receiving the multicast transmission of the first streaming media content
wherein the server is configured to periodically send polling messages to one or more clients of the plurality of clients requesting that respective recipients of the polling messages respond with a message indicating that the respective recipients desire to (i) receive or (ii) continue to receive streaming content from the at least one source, wherein the server includes logic at the application layer of the network protocol to at least one of (a) analyze received responses to the polling messages or (b) evaluate a lack of received responses to the polling messages in order to make a determination as to whether at least one client of the plurality of clients desires to at least one of (1) receive streaming content or (2) continue to receive streaming content from the at least one source.

18. An apparatus for delivering streaming media content from at least one source to a plurality of clients over a network, the apparatus comprising:
a server configured to receive a first streaming media content from a first source and configured to multicast the received first streaming media content to at least one client of the plurality of clients,
wherein the server includes logic, at an application layer of a network protocol, to determine whether any of the plurality of clients desires to at least one of:
receive a multicast transmission of the first streaming media content; or
continue receiving a multicast transmission of the first streaming media content, and
wherein the server includes logic to at least one of prevent the first streaming media content from being placed on the network or prevent the first streaming media content from continuing to be placed on the network if at least one of:
it is determined that no client desires to receive the multicast transmission of the streaming media content; or
it is determined that no client desires to continue receiving the multicast transmission of the first streaming media content
wherein the server is configured to periodically send polling messages to one or more clients of the plurality of clients requesting that respective recipients of the polling messages respond with a message indicating that the respective recipients desire to (i) receive or (ii) continue to receive streaming content from the at least one source, wherein the server includes logic at the application layer of the network protocol to at least one of (a) analyze received responses to the polling messages or (b) evaluate a lack of received responses to the polling messages in order to make a determination as to whether at least one client of the plurality of clients desires to at least one of (1) receive streaming content or (2) continue to receive streaming content from the at least one source.

19. A video distribution system, comprising:
a server; and
a plurality of cameras configured to send respective streaming video contents to the server,
wherein the server is configured to receive at least some of the sent streaming video contents and configured to multicast at least some of the received streaming media content to a plurality of clients over a network, and
wherein the server is configured to limit the number of multicasts of respective streaming media contents to a total bit rate that does not exceed a network bandwidth by determining, at an application layer of a network protocol, whether at least one of the received streaming video contents is desired to be viewed by a client and not placing that at least one received streaming video onto the network if the at least one client does not desire to view the received streaming video
wherein the server is configured to periodically send polling messages to one or more clients of the plurality of clients requesting that respective recipients of the polling messages respond with a message indicating that the respective recipients desire to (i) receive or (ii) continue to receive at least one of the streaming video contents, wherein the server includes logic at the application layer of the network protocol to at least one of (a) analyze received responses to the polling messages or (b) evaluate a lack of received responses to the polling messages in order to make a determination as to Whether at least one client of the plurality of clients desires to at least one of (1) receive the at least one of the streaming video contents or (2) continue to receive the at least one of the streaming video contents.

* * * * *